(12) United States Patent  
Kim et al.

(10) Patent No.: US 11,845,439 B2  
(45) Date of Patent: Dec. 19, 2023

(54) PREDICTION OF TARGET OBJECT'S BEHAVIOR BASED ON WORLD AND IMAGE FRAMES

(71) Applicant: Canoo Technologies Inc., Torrance, CA (US)

(72) Inventors: Kilsoo Kim, Redondo Beach, CA (US); Jongmoo Choi, Gardena, CA (US); Mayukh Sattiraju, Redondo Beach, CA (US); Dheemanth Uppalapati, Marina Del Rey, CA (US); Dhruvil Darji, Torrance, CA (US); Siddharth Agarwal, Torrance, CA (US); Shanmukha M. Bhumireddy, Torrance, CA (US); Aviral K. Singh, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 205 days.

(21) Appl. No.: 17/449,409

(22) Filed: Sep. 29, 2021

(65) Prior Publication Data

US 2023/0102844 A1  Mar. 30, 2023

(51) Int. Cl.
*B60W 40/02* (2006.01)
*B60W 60/00* (2020.01)
(Continued)

(52) U.S. Cl.
CPC ............ *B60W 40/02* (2013.01); *B60W 10/18* (2013.01); *B60W 10/20* (2013.01);
(Continued)

(58) Field of Classification Search
CPC ...... B60W 40/00; B60W 10/00; B60W 30/00; B60W 50/00; B60W 60/00; B60W 2420/00; B60W 2554/00; G06V 20/00
See application file for complete search history.

(56) References Cited

U.S. PATENT DOCUMENTS 11,210,533 B1 * 12/2021 Cha .................... G06V 20/58
2014/0149013 A1 * 5/2014 Matsuno ................ B60R 21/00
701/70

(Continued)

OTHER PUBLICATIONS

Bouhoute, Afaf, et al., "On the Application of Machine Learning for Cut-in Maneuver Recognition in Platooning Scenarios", 2020 IEEE 91st Vehicular Technology Conference (VTC2020-Spring), 2020, 5 pages.

(Continued)

*Primary Examiner* — Aniss Chad  
*Assistant Examiner* — Elizabeth J Slowik (57) ABSTRACT

A method includes obtaining sensor data associated with a target object at an ego vehicle, where the sensor data includes image data within an image frame. The method also includes identifying a first longitudinal distance of a first point of the target object from the ego vehicle within a world frame. The method further includes identifying a first lateral distance of the first point of the target object from the ego vehicle within the world frame using a first normalization ratio that is based on the image data. The method also includes predicting a future path of the target object based on the first longitudinal distance and the first lateral distance. In addition, the method includes controlling at least one operation of the ego vehicle based on the predicted future path of the target object.

24 Claims, 5 Drawing Sheets

(51) Int. Cl.
*B60W 50/00* (2006.01)
*B60W 50/16* (2020.01)
*B60W 30/14* (2006.01)
*B60W 10/18* (2012.01)
*B60W 10/20* (2006.01)
*G06V 20/56* (2022.01)
*B60W 50/06* (2006.01)

(52) U.S. Cl.
CPC ...... *B60W 30/143* (2013.01); *B60W 50/0097* (2013.01); *B60W 50/06* (2013.01); *B60W 60/0015* (2020.02); *G06V 20/56* (2022.01); *B60W 2420/52* (2013.01); *B60W 2554/801* (2020.02); *B60W 2554/802* (2020.02)

(56) References Cited

U.S. PATENT DOCUMENTS

| | | | | |
|---|---|---|---|---|
| 2018/0162387 A1* | 6/2018 | Sung | ................ | G08G 1/165 |
| 2018/0208186 A1* | 7/2018 | Liu | ................ | B60W 30/0956 |
| 2019/0353784 A1* | 11/2019 | Toledano | ............. | G05D 1/0212 |
| 2020/0180656 A1* | 6/2020 | Kim | ................ | B60W 30/0956 |
| 2020/0218906 A1* | 7/2020 | Wang | ................ | G06V 20/588 |
| 2020/0218979 A1* | 7/2020 | Kwon | ................ | B60W 30/14 |
| 2020/0238991 A1* | 7/2020 | Aragon | ............... | G06V 10/446 |
| 2020/0369264 A1* | 11/2020 | Cheon | ................ | B60W 30/09 |
| 2021/0295171 A1* | 9/2021 | Kamenev | ................ | G06T 7/70 |
| 2021/0354729 A1* | 11/2021 | Ng | ................ | B60W 60/0018 |
| 2022/0266874 A1* | 8/2022 | Blandizzi | ........ | B60W 60/00274 |
| 2023/0085455 A1* | 3/2023 | Mori | ................ | B60W 40/02 |
| | | | | 382/104 |

OTHER PUBLICATIONS

Heinemann, Tonja, "Predicting Cut-Ins in Traffic Using a Neural Network", Master's thesis in Systems, Control and Mechatronics, Chalmers University of Technology, Department of Electrical Engineering, Gothenburg, Sweden, 2017, 62 pages.

Bar Hillel, Aharon, et al., "Recent Progress in Road and Lane Detection: A Survey", Machine Vision and Applications, Apr. 2014, 20 pages.

Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.

Narote, S.P., et al., "A Review of Recent Advances in Lane Detection and Departure Warning System", Pattern Recognition, vol. 73, Jan. 2018, 50 pages.

Kim et al., "System and Method in the Prediction of Target Vehicle Behavior Based on Image Frame and Normalization", U.S. Appl. No. 17/305,701, filed Jul. 13, 2021, 27 pages.

* cited by examiner

PREDICTION OF TARGET OBJECT'S BEHAVIOR BASED ON WORLD AND IMAGE FRAMES

TECHNICAL FIELD

This disclosure relates generally to prediction systems. More specifically, this disclosure relates to the prediction of a target object's behavior based on world and image frames.

BACKGROUND

Advanced driving assist system (ADAS) features use automated technology to assist a vehicle's operator in driving and parking and form a foundation for autonomous driving (AD). The detection of another vehicle and the estimation of the other vehicle's future behavior enable features such as collision detection and avoidance for adaptive cruise control (ACC) or emergency braking; blind spot detection for collision warning and/or evasive steering; and path planning and control. As a particular example, cut-in, cut-out, or cut-through of a target vehicle may be predicted to support safer and more comfortable adaptive cruise control or other features. Cut-in prediction refers to an estimation of when a target vehicle may enter a traffic lane occupied by an ego vehicle, where the ego vehicle refers to the vehicle on which one or more sensors used for ADAS, AD, or other features are mounted. Cut-out prediction refers to an estimation of when a target vehicle may exit a traffic lane occupied by an ego vehicle. Cut-through prediction refers to an estimation of when a target vehicle may enter and then exit a traffic lane occupied by an ego vehicle.

SUMMARY

This disclosure relates to the prediction of a target object's behavior based on world and image frames.

In a first embodiment, a method includes obtaining sensor data associated with a target object at an ego vehicle, where the sensor data includes image data within an image frame. The method also includes identifying a first longitudinal distance of a first point of the target object from the ego vehicle within a world frame. The method further includes identifying a first lateral distance of the first point of the target object from the ego vehicle within the world frame using a first normalization ratio that is based on the image data. The method also includes predicting a future path of the target object based on the first longitudinal distance and the first lateral distance. In addition, the method includes controlling at least one operation of the ego vehicle based on the predicted future path of the target object.

In a second embodiment, an apparatus associated with an ego vehicle includes at least one processing device configured to obtain sensor data associated with a target object, where the sensor data includes image data within an image frame. The at least one processing device is also configured to identify a first longitudinal distance of a first point of the target object from the ego vehicle within a world frame. The at least one processing device is further configured to identify a first lateral distance of the first point of the target object from the ego vehicle within the world frame using a first normalization ratio that is based on the image data. The at least one processing device is also configured to predict a future path of the target object based on the first longitudinal distance and the first lateral distance. In addition, the at least one processing device is configured to control at least one operation of the ego vehicle based on the predicted future path of the target object.

In a third embodiment, a non-transitory machine-readable medium contains instructions that when executed cause at least one processor associated with an ego vehicle to obtain sensor data associated with a target object, where the sensor data includes image data within an image frame. The medium also contains instructions that when executed cause the at least one processor to identify a first longitudinal distance of a first point of the target object from the ego vehicle within a world frame. The medium further contains instructions that when executed cause the at least one processor to identify a first lateral distance of the first point of the target object from the ego vehicle within the world frame using a first normalization ratio that is based on the image data. The medium also contains instructions that when executed cause the at least one processor to predict a future path of the target object based on the first longitudinal distance and the first lateral distance. In addition, the medium contains instructions that when executed cause the at least one processor to control at least one operation of the ego vehicle based on the predicted future path of the target object.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, advanced driving assist system (ADAS) features use automated technology to assist a vehicle's operator in driving and parking and form a foundation for autonomous driving (AD). The detection of another vehicle and the estimation of the other vehicle's future behavior enable features such as collision detection and avoidance for adaptive cruise control (ACC) or emergency braking; blind spot detection for collision warning and/or evasive steering; and path planning and control. As a particular example, cut-in, cut-out, or cut-through of a target vehicle may be predicted to support safer and more comfortable adaptive cruise control or other features. Cut-in prediction refers to an estimation of when a target vehicle may enter a traffic lane occupied by an ego vehicle, where the ego vehicle refers to the vehicle on which one or more sensors used for ADAS, AD, or other features are mounted. Cut-out prediction refers to an estimation of when a target vehicle may exit a traffic lane occupied by an ego vehicle. Cut-through prediction refers to an estimation of when a target vehicle may enter and then exit a traffic lane occupied by an ego vehicle.

Information processed by an ego vehicle is often expressed within a "world frame," which refers to a three-dimensional (3D) coordinate system associated with the environment around the ego vehicle. In some cases, the world frame may be fixed relative to the ego vehicle's surrounding environment. In other cases, the world frame may be expressed based on a (movable) frame of the ego vehicle itself. For instance, an "x" axis may denote an axis traveling front and back through a longitudinal center of the ego vehicle, a "y" axis may denote an axis traveling left and right through the ego vehicle, and a "z" axis may denote an axis traveling up and down through the ego vehicle. In contrast, sensors used on or with an ego vehicle may include at least one camera or other types of imaging sensors, and one or more of these sensors may collect information by capturing images of scenes around the ego vehicle. In those cases, the information captured by the sensor(s) is said to be captured within a two-dimensional (2D) "image frame."

Prior approaches typically transform information from an image frame into corresponding information in a world frame in order to further process and use the information. However, this transformation may not always be accurate and can introduce various errors into the information being processed. For example, object detection may be performed using image data to identify an object (such as another vehicle) near the ego vehicle and to identify a boundary (such as a bounding box) around the detected object, or object detection may be performed using image data to identify lane-marking lines and other markings on a road or other surface. Converting object boundaries, lane-marking lines or other lines, or other object detection results identified using an image frame to a world frame often involves using a camera's intrinsic and extrinsic calibration parameters and an additional constraint that allows a 3D location to be identified based on 2D measurements. Unfortunately, in a driving environment, a planar road structure is often assumed in order to compute a transformation, and both camera calibration errors and planar structure assumptions can lead to localization errors in the transformed data. If the transformed data is then used with functions such as cut-in, cut-out, or cut-through predictions, the localization errors in the transformed data can limit the accuracy of the predictions. Among other things, this can limit the ability of the ego vehicle to effectively predict the behavior of a nearby target vehicle or other target object.

This disclosure provides techniques for predicting a target object's behavior based on information in both world and image frames. As described in more detail below, a first type of sensor, such as a RADAR sensor, can be used to generate distance measurements associated with a target object, such as a target vehicle near an ego vehicle. The first type of sensor may be more accurate in a longitudinal dimension and less accurate in a lateral dimension within a vehicle coordinate system (VCS) or other world frame. This means that the first type of sensor may more accurately estimate the distance to the target object along the "x" axis (the axis traveling front and back through the ego vehicle) and less accurately estimate the distance to the target object along the "y" axis (the axis traveling left and right through the ego vehicle). Image information is captured using a second type of sensor, such as a camera, and the image information is expressed within an associated image frame. The image information can be processed in order to determine how measurements by the first type of sensor in the lateral dimension can be improved or replaced, such as by generating a normalization ratio that is used to generate lateral distance measurements. This can be accomplished without requiring a transformation of the image information from the image frame into the world frame, which can help to avoid the use of a possibly inaccurate transformation and can increase the accuracy of the measurements associated with the target object.

The measurements in the longitudinal and lateral dimensions (or just the measurements in the lateral dimension) may be used in any suitable manner by the ego vehicle. For example, the ego vehicle may use longitudinal and lateral measurements associated with a target vehicle in order to estimate a polynomial that defines an expected or estimated path of the target vehicle for some period of time in the future. In some embodiments, the ego vehicle can then use the estimated path of the target vehicle to predict if and when the target vehicle may cut into, cut out of, or cut through the current traffic lane occupied by the ego vehicle. If cut-in, cut-out, or cut-through of the target vehicle is predicted to occur, the ego vehicle may identify and implement at least one action based on the cut-in, cut-out, or cut-through prediction, such as by changing a speed of the ego vehicle, initiating emergency braking or evasive steering, or triggering a collision warning or other notification. Because the cut-in, cut-out, or cut-through predictions can be more accurate based on improved measurements associated with target vehicles, the ego vehicle is able to implement features such as adaptive cruise control, emergency braking, collision warning, or evasive steering more effectively. Note, however, that the example uses of the improved measurements here are for illustration only and that improved target vehicle measurements or other improved object measurements generated in accordance with the teachings of this disclosure may be used in any other suitable manner.

Figure 1:
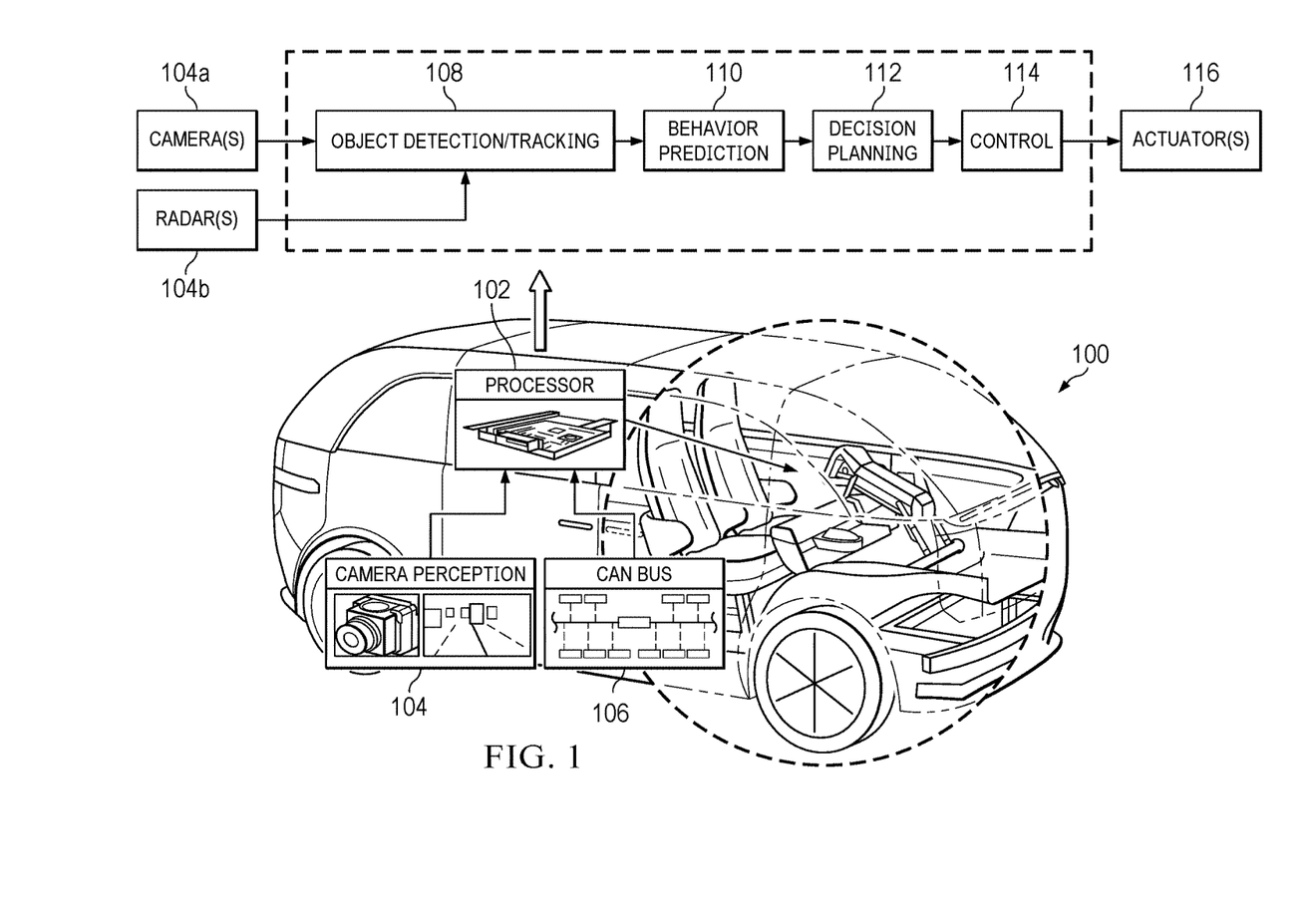
FIG. 1 illustrates an example system supporting prediction of a target object's behavior based on world and image frames according to this disclosure.

FIG. 1 illustrates an example system 100 supporting prediction of a target object's behavior based on world and image frames according to this disclosure. In this particular example, the system 100 takes the form of an automotive vehicle, such as an electric vehicle. However, any other suitable system may support prediction of a target object's behavior based on world and image frames, such as other types of vehicles, autonomous robots, or other autonomous or non-autonomous systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more cameras or other imaging sensors, and the bus 106 represents a controller area network (CAN) bus. However, the processor 102 may interact with any additional sensor(s) and communicate over any other or additional bus(es).

The sensors 104 here include one or more cameras 104a that generate images (such as visual or infrared images) of scenes around the system 100. The sensors 104 here also include one or more RADAR sensors 104b that generate RADAR-based measurements (such as relative distances and relative azimuth angles) for objects around the system 100. Additional types of sensors that could be used here include one or more light detection and ranging (LIDAR) sensors, other types of imaging sensors, or inertial measurement units (IMUs). Measurements or other data from the sensors 104 are used by the processor 102 or other component(s) as described below to generate predictions of target objects' behaviors based on world and image frames. In some cases, the sensors 104 may include a single camera 104a, such as one camera positioned on the front of a vehicle. In other cases, the sensors 104 may include multiple cameras 104a, such as one camera positioned on the front of a vehicle, one camera positioned on the rear of the vehicle, and two cameras positioned on opposite sides of the vehicle. Similarly, the sensors 104 may include any suitable number of RADAR sensors 104b in any suitable arrangement.

The processor 102 can process the information from the sensors 104 in order to detect objects around or proximate to the system 100, such as one or more vehicles, obstacles, or people near the system 100. The processor 102 can also process the information from the sensors 104 in order to perceive lane-marking lines or other markings on a road, floor, or other surface. The processor 102 can further use various information to generate predictions associated with the system 100, such as to predict the future path(s) of the system 100 or other vehicles, identify a center of a traffic lane in which the system 100 is traveling, or predict the future locations of objects around the system 100. As described below, at least some of the predictions generated by the processor 102 can include predictions of the future behaviors of one or more target vehicles (one or more other vehicles around the system 100) or other objects based on world and image frames, such as prediction(s) of the path(s) to be taken by the target vehicle(s).

In this example, the processor 102 performs an object detection/tracking function 108, which generally involves identifying objects around the system 100 in a real-time manner based on information from one or more of the sensors 104. For example, the object detection/tracking function 108 can use images from one or more cameras 104a and measurements from one or more RADAR sensors 104b to identify target objects around the system 100, such as other vehicles moving around or towards the system 100, pedestrians or objects near the system 100, or lane-marking lines or other markings. The object detection/tracking function 108 can also identify one or more characteristics of each of one or more target objects, such as an object class (a type of object), a boundary around the target object (like a bounding box), and a distance to the target object. The object detection/tracking function 108 can output information identifying each detected target object and its associated characteristic(s), which can be expressed within world and image frames. For instance, boundaries of target vehicles or other target objects or other information generated using the camera 104a may be expressed within the image frame. Distance measurements to target vehicles or other target objects or other information generated using the RADAR sensor 104b may be expressed within the vehicle coordinate system or other world frame, such as when a distance to a target vehicle is expressed as a longitudinal distance and a lateral distance. The object detection/tracking function 108 can use any suitable technique to perform object detection and tracking, such as by using a trained machine learning model.

The processor 102 also performs a behavior prediction function 110, which generally involves using information about one or more detected target objects to predict a future behavior of each of those target objects. For example, the behavior prediction function 110 may merge associated information from the world and image frames, such as by combining measurements or other information about the same target objects from the world and image frames. As a particular example, the behavior prediction function 110 may identify object detection results for the same target object that are determined based on information from the camera(s) 104a and information from the RADAR sensor(s) 104b. The behavior prediction function 110 also uses the information from the object detection/tracking function 108 to predict a future path for each of one or more detected target objects around the system 100 based on historical information about the behavior of that detected target object. For instance, the behavior prediction function 110 may generate a polynomial identifying the expected path to be taken by a detected target vehicle near the system 100 based on information about the prior behavior of that target vehicle. In some cases, the polynomial generated for a target object can be based on one or more detected positions of that target object relative to the system 100 over time.

The behavior prediction function 110 may further compare the expected paths of the detected target objects with lane-marking lines to make predictions about whether any of the detected target objects are expected to cut into, cut out of, or cut through the current traffic lane occupied by the system 100. For example, each detected lane-marking line may be associated with a polynomial that defines the path of the detected lane-marking line. The behavior prediction function 110 can therefore compare the expected path of a detected target object (as defined by its polynomial) to at least one of the detected lane-marking lines (as defined by its polynomial) to determine if the expected path of the target object intersects with a lane-marking line. If so, this indicates that a cut-in, cut-out, or cut-through of the target object is predicted to occur, and a time to line crossing (TTLC) value can be determined, which estimates the amount of time for the detected target object to cross the detected lane-marking line. As described in more detail below, this process of estimating the paths of target objects and determining times to line crossings can be based on information from both the world and image frames, and no inaccurate transformations of information from the image frame to the world frame may be needed here.

Information from the behavior prediction function 110 (and possibly information from one or more other sources) may be provided to a decision planning function 112, which generally uses this information to determine how to adjust the operation of the system 100. For example, the decision planning function 112 may determine whether (and how) to change the steering direction of the ego vehicle (the system 100), whether (and how) to apply the brakes or accelerate the vehicle, or whether (and how) to trigger an audible, visible, haptic, or other warning. The warning may indicate that the system 100 is near another vehicle, obstacle, or person, is departing from a current traffic lane in which the vehicle is traveling, or is approaching a possible impact location with another vehicle, obstacle, or person. As particular examples, the decision planning function 112 may operate to implement changes to adaptive cruise control or to trigger emergency braking or evasive steering in response to a detected cut-in, cut-out, or cut-through of a target object into, out of, or through the current traffic lane of the ego vehicle. In general, the identified adjustments determined by the decision planning function 112 can vary widely based on the specific application.

The decision planning function 112 can interact with one or more control functions 114, each of which can be used to adjust or control the operation of one or more actuators 116 in the system 100. For example, in an automotive vehicle, the one or more actuators 116 may represent one or more brakes, electric motors, or steering components of the vehicle, and the control function(s) 114 can be used to apply or discontinue application of the brakes, speed up or slow down the electric motors, or change the steering direction of the vehicle. In general, the specific way(s) in which detected target objects can be used may vary depending on the specific system 100 in which object detection is being used.

Note that the functions 108-114 shown in FIG. 1 and described above may be implemented in any suitable manner in the system 100. For example, in some embodiments, various functions 108-114 may be implemented or supported using one or more software applications or other software instructions that are executed by at least one processor 102. In other embodiments, at least some of the functions 108-114 can be implemented or supported using dedicated hardware components. In general, the functions 108-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-114 described above. This may allow, for instance, the processor(s) 102 to be used to process information, track multiple target objects, and predict paths of the multiple target objects in parallel.

Although FIG. 1 illustrates one example of a system 100 supporting prediction of a target object's behavior based on world and image frames, various changes may be made to FIG. 1. For example, various functions and components shown in FIG. 1 may be combined, further subdivided, replicated, omitted, or rearranged and additional functions and components may be added according to particular needs. Also, as noted above, the functionality for prediction of a target object's behavior may be used in any other suitable system, and the system may or may not relate to automotive vehicles or other vehicles.

Figure 2:
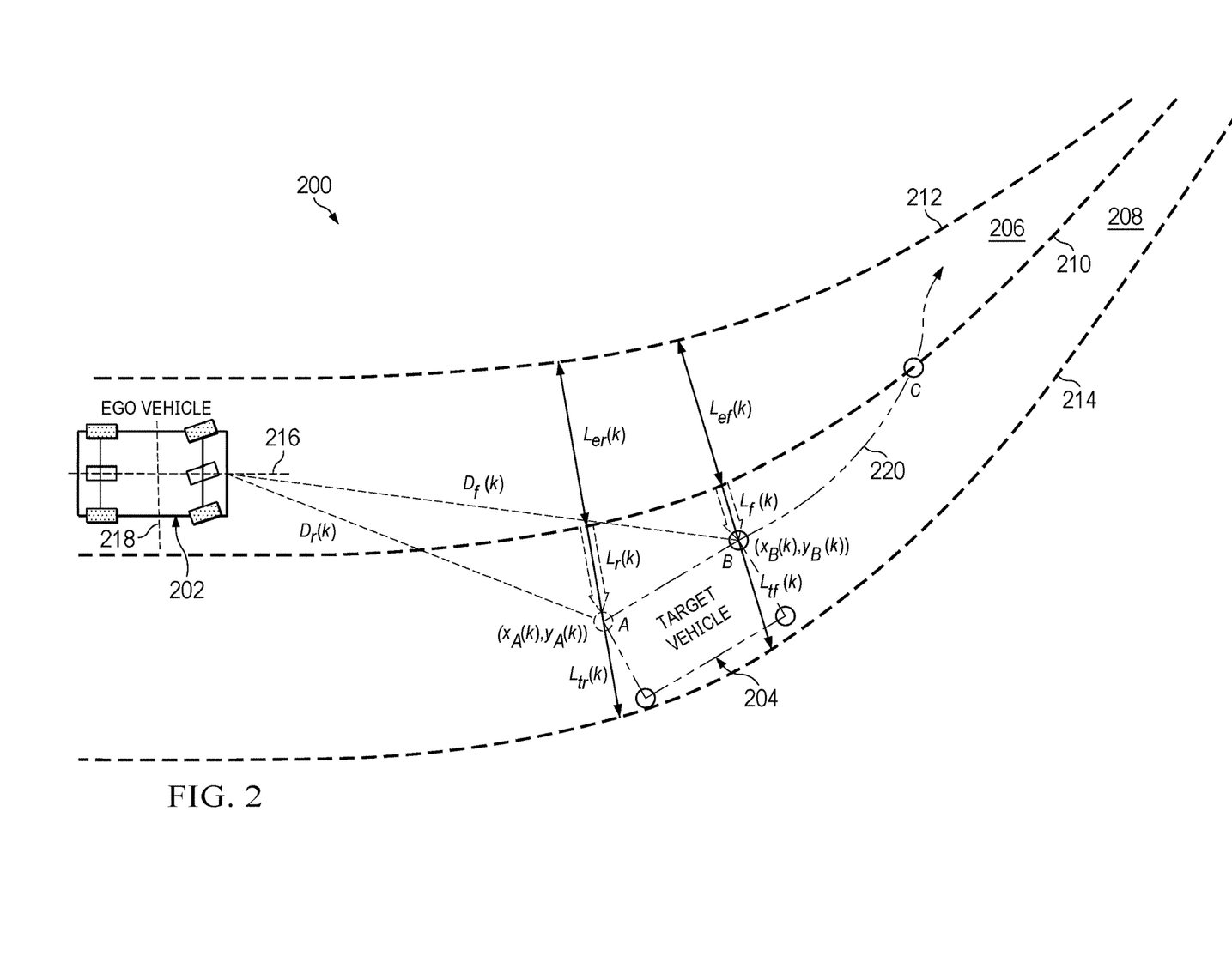
FIG. 2 illustrates an example prediction of a target object's behavior based on world and image frames according to this disclosure.

FIG. 2 illustrates an example prediction 200 of a target object's behavior based on world and image frames according to this disclosure. For ease of explanation, the prediction 200 of FIG. 2 is described as involving the use of the system 100 of FIG. 1. However, the prediction 200 of FIG. 2 may be performed by any other suitable device or system, such as any other suitable device or system supporting or using object detection. Also, the example prediction 200 shown in FIG. 2 represents one possible use of the system 100 of FIG. 1. However, other types of predictions may be performed using the system 100 and used in any other suitable manner.

As shown in FIG. 2, an ego vehicle 202 and a target vehicle 204 are respectively traveling within adjacent traffic lanes 206 and 208. The ego vehicle 202 includes or represents the system 100 of FIG. 1, and the target vehicle 204 represents a target object that is detected using the system 100. The traffic lanes 206 and 208 are separated by a lane-marking line 210 (such as a solid or dashed lane-marking line), and additional lane-marking lines 212 and 214 may define other boundaries of the associated traffic lanes 206 and 208. A vehicle coordinate system of the ego vehicle 202 represents a world frame and includes a longitudinal dimension 216 and a lateral dimension 218. The longitudinal dimension 216 represents or is defined by an axis extending through the center of the ego vehicle 202 and along the length of the ego vehicle 202. The lateral dimension 218 is perpendicular to the longitudinal dimension 216 and represents or is defined by an axis extending through the center of the ego vehicle 202 and across the width of the ego vehicle 202.

The rear corner of the target vehicle 204 closest to the lane-marking line 210 here is denoted point "A", and the front corner of the target vehicle 204 closest to the lane-marking line 210 here is denoted point "B". Ideally, tracking the location of the front corner "B" of the target vehicle 204 or tracking the distance to the front corner "B" of the target vehicle 204 from the lane-marking line 210 over time can allow for a cut-in or cut-through prediction to be made. That is, if the front corner "B" of the target vehicle 204 is predicted to intersect the lane-marking line 210 based on the collected or generated information about the target vehicle 204 over time, it is possible for the ego vehicle 202 to make an accurate cut-in or cut-through prediction regarding the target vehicle 204 entering the ego vehicle's traffic lane 206.

Measurements by the RADAR sensor 104b within the world frame often represent relative distances and relative azimuth angles of the target vehicle 204 with respect to the ego vehicle 202. Each relative azimuth angle may represent the angle of a relative distance measurement to the target vehicle 204 with respect to the longitudinal dimension 216. Each RADAR measurement defined by a relative distance and a relative azimuth angle can be decomposed into a longitudinal distance along the longitudinal dimension 216 and a lateral distance along the lateral dimension 218. Unfortunately, there tend to be larger errors in the measured distances along the lateral dimension 218 and smaller errors in the measured distances along the longitudinal dimension 216. Among other reasons, this is often due to the fact that distances being measured in the longitudinal dimension 216 are larger than distances being measured in the lateral dimension 218. Thus, relative errors in the longitudinal and lateral dimensions 216, 218 will have larger impacts on the measurements in the lateral dimension 218 and smaller impacts on the measurements in the longitudinal dimension 216.

RADAR measurements of the target vehicle 204 that are captured by the ego vehicle 202 can typically only identify the closest point of the target vehicle 204 to the ego vehicle 202. As a result, in the example shown in FIG. 2, the RADAR measurements captured by the RADAR sensor 104b may be used to identify a distance $D_r(k)$ between the ego vehicle 202 and the rear corner "A" of the target vehicle 204. This distance $D_r(k)$ can be decomposed into two distances $(x_A(k), y_A(k))$, where $x_A(k)$ denotes the longitudinal distance of the rear corner "A" of the target vehicle 204 from the ego vehicle 202 and $y_A(k)$ denotes the lateral distance of the rear corner "A" of the target vehicle 204 from the ego vehicle 202. However, as described above, it would be useful to identify the distance $D_f(k)$ from the ego vehicle 202 to the closer front corner "B" of the target vehicle 204. This distance $D_f(k)$ can also be decomposed into two distances $(x_B(k), y_B(k))$, where $x_B(k)$ denotes the longitudinal distance of the front corner "B" of the target vehicle 204 from the ego vehicle 202 and $y_B(k)$ denotes the lateral distance of the front corner "B" of the target vehicle 204 from the ego vehicle 202. Accurate knowledge of the lateral distance of the front corner "B" of the target vehicle 204 from the ego vehicle 202 over time can be used to make cut-in, cut-out, and cut-through predictions for the target vehicle 204. Accurate knowledge of the lateral distance of the rear corner "A" of the target vehicle 204 from the ego vehicle 202 over time might also be used to make cut-in, cut-out, and cut-through predictions for the target vehicle 204, although this may generally be less accurate and/or may require more time for prediction.

In order to improve the accuracy of the lateral distance measurements to the front and rear corners of the target vehicle 204, lateral distance measurements can be modified or calculated based on information obtained or derived within the image frame. For example, an image captured of the target vehicle 204 by the ego vehicle 202 can include pixels of image data for the target vehicle 204 itself and for the traffic lanes 206, 208 in which the vehicles 202, 204 are traveling. The processor 102 in the ego vehicle 202 can calculate normalization ratios based on (i) the apparent distances of the front and rear corners of the target vehicle 204 from the lane-marking line 210 as measured in pixels and (ii) the apparent width(s) of one or more of the traffic lanes 206, 208 as measured in pixels. These normalization ratios can be calculated using the image frame but then applied to calculations within a different frame of reference (namely the world frame) since the normalization ratios are "unit-less". That is, dividing a number of pixels by a number of pixels results in a normalization ratio value with no unit of measurement. This allows for application of the normalization ratios from the image frame to information within the world frame without requiring any frame transformations.

Using the example shown in FIG. 2, the distance $D_f(k)$ to the front corner "B" of the target vehicle 204 can be calculated based on the measurable distance $D_r(k)$ to the rear corner "A" of the target vehicle 204. Here, it is assumed that the RADAR sensor 104b can be used to measure the distance $D_r(k)$ and that this distance $D_r(k)$ can be decomposed into the distances $(x_A(k), y_A(k))$. It is then possible to replace the lateral distance $y_A(k)$ generated within the world frame with a lateral distance $y_A(k)$ generated within the image frame, where the lateral distance generated within the image frame is based on a normalization ratio as described above. In some embodiments, the lateral distance $y_A(k)$ generated within the image frame can be determined as follows.

$$y_A(k) = \frac{L_r(k)}{L_{tr}(k)} \cdot L_t(k) + \Delta_y(x_A) \tag{1}$$

Here, $L_r(k)$ represents a distance (as measured in pixels) of the rear corner "A" of the target vehicle 204 from the lane-marking line 210, and $L_{tr}(k)$ represents a width (as measured in pixels) of the traffic lane 208 in which the target vehicle 204 is traveling at the rear end of the target vehicle 204. Both of these values can be obtained using the image frame, and the ratio $L_r(k)/L_{tr}(k)$ represents a unit-less normalization ratio. Also, $L_t(k)$ represents a width of the traffic lane 208 in which the target vehicle 204 is traveling from the world frame, and $\Delta_y(x_A)$ represents a lateral offset of the target vehicle 204 from the longitudinal dimension 216 at a distance $x_A$ as determined in the world frame. In this example, the normalization ratio $L_r(k)/L_{tr}(k)$ helps to remove an inaccurate transformation from the image frame to the world frame. Note that it may not be possible to accurately measure the width $L_t(k)$ of the adjacent traffic lane 208 in some cases, so $L_t(k)$ in Equation (1) may be replaced by the width of the traffic lane 206 in which the ego vehicle 202 is traveling from the world frame (which is based on the assumption that traffic lanes tend to be relatively equal in width). In FIG. 2, $L_{er}(k)$ represents a width of the traffic lane 206 in which the ego vehicle 202 is traveling at the rear end of the target vehicle 204.

The decomposed version $(x_B(k), y_B(k))$ of the distance $D_f(k)$ to the front corner "B" of the target vehicle 204 may be determined as follows.

$$x_B(k) \approx x_A(k) + L_{TV} \tag{2}$$

$$y_B(k) = \frac{L_f(k)}{L_{tf}(k)} \cdot L_t(k) + \Delta_y(x_B) \tag{3}$$

Here, $L_{TV}$ represents an estimated length of the target vehicle 204, which may be estimated in any suitable manner (such as based on a cuboid representation of the target vehicle 204). Also, $L_f(k)$ represents a distance (as measured in pixels) of the front corner "B" of the target vehicle 204 from the lane-marking line 210, and $L_{tf}(k)$ represents a width (as measured in pixels) of the traffic lane 208 in which the target vehicle 204 is traveling at the front end of the target vehicle 204. Both of these values can be obtained using the image frame, and the ratio $L_f(k)/L_{tf}(k)$ represents another unit-less normalization ratio. Further, $\Delta_y(x_B)$ represents a lateral offset of the target vehicle 204 from the longitudinal dimension 216 at a distance $x_B$ as determined in the world frame. In this example, the normalization ratio $L_f(k)/L_{tf}(k)$ helps to remove an inaccurate transformation from the image frame to the world frame. Again, note that it may not be possible to accurately measure the width $L_t(k)$ of the adjacent traffic lane 208 in some cases, so $L_t(k)$ in Equation (3) may be replaced by the width of the traffic lane 206 in which the ego vehicle 202 is traveling from the world frame. In FIG. 2, $L_{ef}(k)$ represents a width of the traffic lane 206 in which the ego vehicle 202 is traveling at the front end of the target vehicle 204.

In each of these cases (lateral distances of the front and rear corners of the target vehicle 204), the lateral distance can be calculated based on image frame information using a "lane width×normalization ratio" calculation. The lane width in each calculation can be updated continuously, intermittently, or in any other suitable manner using the world frame. The normalization ratio in each calculation can be obtained from image data and normalized so that it can be used within the world frame without any (possibly inaccurate) transformation from the image frame, which can reduce or eliminate one potential source of errors in target object behavior predictions.

In some embodiments, the lateral distances related to the front corner and/or rear corner of the target vehicle 204 over time can be used to predict an estimated path of the target vehicle 204. For example, the processor 102 in the ego vehicle 202 can generate a polynomial that tracks the history of the target vehicle's lateral location relative to the ego vehicle 202 over time. In some cases, the trajectory of the front or rear corner of the target vehicle 204 can be defined using a polynomial having the following form.

$$y_B = \sum_{i=0}^{n} a_i x^i \quad (4)$$

Here, $a_i$ represents the $i^{th}$ polynomial coefficient, and n represents the order of the polynomial. The polynomial defining the trajectory of the target vehicle 204 may be generated in any suitable manner, such as by using a curve fitting or filtering algorithm. In the example shown in FIG. 2, the processor 102 in the ego vehicle 202 can estimate that the target vehicle 204 will follow a path 220 defined by a specified polynomial.

The estimated path of the target vehicle 204 can be compared to the locations of the lane-marking lines 210-214 in order to estimate if and when the target vehicle 204 is predicted to enter or exit the traffic lane 206 of the ego vehicle 202. For instance, each of the lane-marking lines 210-214 may be associated with a polynomial defining the path of that lane-marking line 210-214, and the processor 102 in the ego vehicle 202 can compare the polynomials and determine if and where the polynomial defining the estimated path 220 of the target vehicle 204 will intersect any of the polynomials defining the paths of the lane-marking lines 210-214. In this example, the processor 102 in the ego vehicle 202 can determine that the target vehicle 204 is estimated to enter the traffic lane 206 of the ego vehicle 202 at an intersection point "C". Based on the identified intersection point, the processor 102 in the ego vehicle 202 can calculate the time to line crossing for the target vehicle 204, meaning the time until the target vehicle 204 is estimated to cross the lane-marking line 210. In some embodiments, the time to line crossing (TTLC) value can be determined as follows.

$$TTLC(k) = \frac{D_{BC}(k)}{V_{target}(k)} \quad (5)$$

Here, $D_{BC}(k)$ represents the distance between the current location of the front corner "B" of the target vehicle 204 and the intersection point "C". Also, $V_{target}(k)$ represents the speed of the target vehicle 204, and the speed $V_{target}(k)$ can be available from any suitable source, such as the RADAR sensor 104b.

As can be seen here, the ability to accurately determine the lateral distances of one or more points of a target vehicle 204 or other target object over time can enable more accurate predictions of lane cut-ins, cut-outs, and cut-throughs. The resulting predictions can then be used to control various features of the ego vehicle 202, such as a speed of the ego vehicle 202, braking of the ego vehicle 202, or steering of the ego vehicle 202. As a particular example, the processor 102 of the ego vehicle 202 may use predictions of lane cut-ins, cut-outs, or cut-throughs in order to control the speed of the ego vehicle 202 during adaptive cruise control operations. As another particular example, the processor 102 of the ego vehicle 202 may use predictions of lane cut-ins, cut-outs, or cut-throughs in order to control whether emergency braking or a collision warning should be activated.

Although FIG. 2 illustrates one example of a prediction 200 of a target object's behavior based on world and image frames, various changes may be made to FIG. 2. For example, the same or similar approach described above may be repeated for any number of target objects detected around the ego vehicle 202. Also, the same or similar approach described above may be used to predict different actions by a target object, such as lane cut-in, lane cut-out, or lane cut-through.

Figure 3:
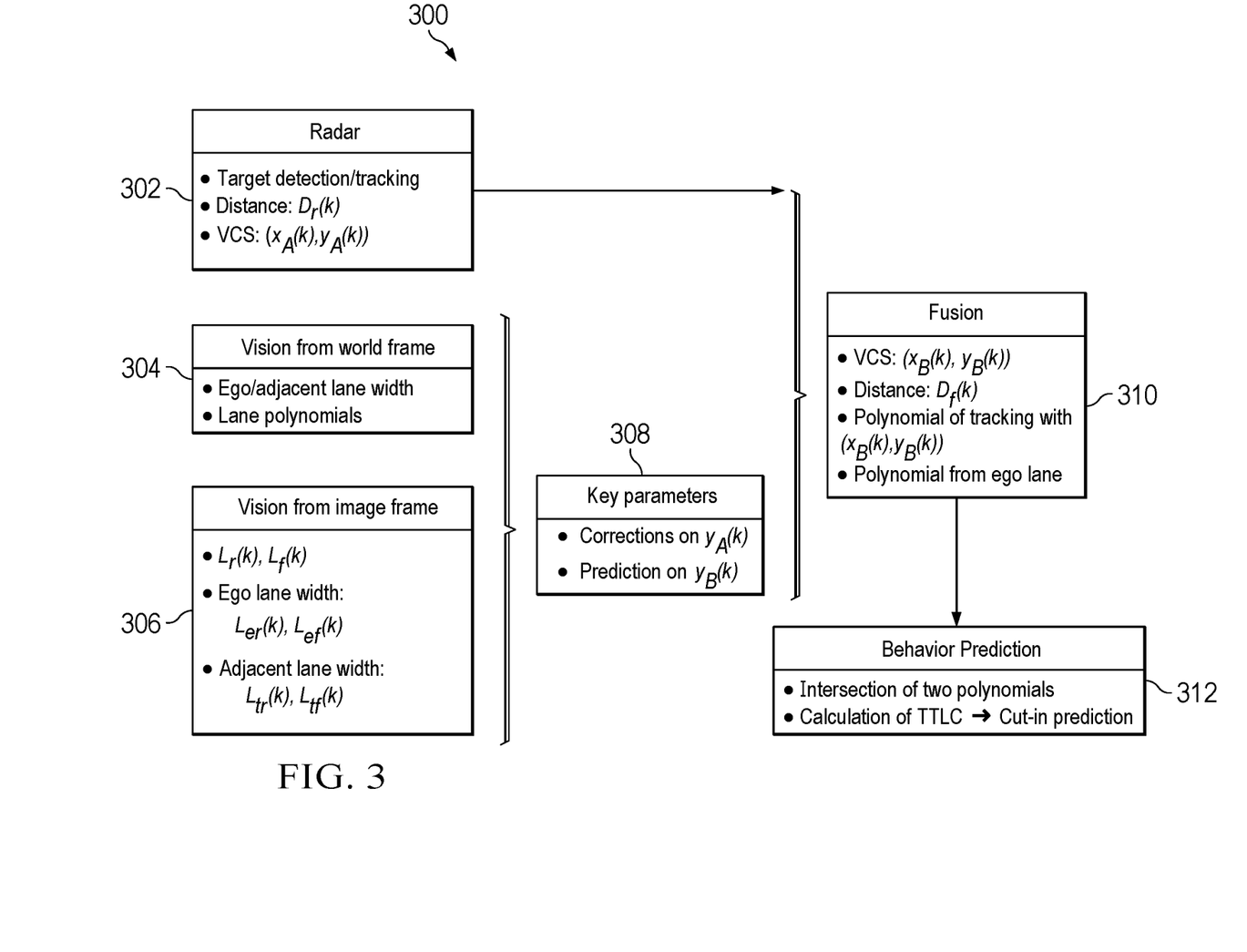
FIG. 3 illustrates an example data flow supporting prediction of a target object's behavior based on world and image frames according to this disclosure.

FIG. 3 illustrates an example data flow 300 supporting prediction of a target object's behavior based on world and image frames according to this disclosure. For ease of explanation, the data flow 300 of FIG. 3 is described as involving the use of the system 100 of FIG. 1 to make the prediction 200 of FIG. 2. However, the data flow 300 of FIG. 3 may be used by any other suitable device or system, such as any other suitable device or system supporting or using object detection, and may be used to make any other suitable predictions.

As shown in FIG. 3, the RADAR sensor 104b can be used to generate various data 302, such as target detection/tracking results. This data 302 can include, for each target vehicle 204 or other target object that is detected or tracked, the distance $D_r(k)$ between an ego vehicle 202 and the closest point of the target object and a decomposed distance $(x_A(k), y_A(k))$ between the ego vehicle 202 and the closest point of the target object. Data 304 based on the world frame and data 306 based on the image frame can also be generated or otherwise obtained. The data 304 can include the width of the current traffic lane 206 in which the ego vehicle 202 is traveling and/or the width of an adjacent traffic lane 208 in which the target object is located. The data 304 can also include one or more polynomials that define one or more lane-marking lines 210-214 associated with one or more traffic lanes 206, 208. The data 306 can include one or more distances $L_r(k)$, $L_f(k)$ (as measured in pixels) between a lane-marking line 210 and one or more points of the target object. The data 306 can also include the widths $L_{er}(k)$, $L_{ef}(k)$ (as measured in pixels) of the traffic lane 206 in which the ego vehicle 202 is traveling and/or the widths $L_{tr}(k)$, $L_{tf}(k)$ (as measured in pixels) of the traffic lane 208 in which the target object is located.

The data 304 and 306 is processed to identify various key parameters 308 to be used during additional data processing operations. As shown here, the key parameters 308 include a correction to be made to a calculated lateral distance $y_A(k)$ involving one point (such as a rear corner) of the target object and a prediction for the lateral distance $y_B(k)$ involving another point (such as a front corner) of the target object. As noted above, for example, the RADAR sensor 104b can generally identify the distance $D_r(k)$ between the ego vehicle 202 and the rear corner of a target vehicle 204, which is the shortest distance between the vehicles 202, 204. However, the lateral distance $y_A(k)$ determined from this RADAR measurement can have a larger error than the longitudinal distance $x_A(k)$ determined from this RADAR measurement. The approach described above can be used to correct or replace the lateral distance $y_A(k)$ as determined from the RADAR measurement using a normalized ratio that is based on the image frame. Also, the approach described above can be used to estimate the lateral distance $y_B(k)$ using another normalized ratio that is based on the image frame.

The data 302 and the key parameters 308 can be used by the processor 102 of the ego vehicle 202 to generate fused data 310, which represents data values where at least some of the data values are generated using information from both the world and image frames. In this example, the fused data 310 can include, for each target vehicle 204 or other target object being tracked, the longitudinal and lateral distances $(x_B(k), y_B(k))$ to the front of the target object and the overall relative distance $D_f(k)$ to the front of the target object. The fused data 310 can also include a polynomial that tracks the longitudinal and lateral distances $(x_B(k), y_B(k))$ of the target object over time, as well as one or more polynomials defining at least one lane-marking line associated with the ego vehicle 202 (such as the lane-marking line 210). The fused data 310 is used (possibly along with other data) to identify predicted data 312. The predicted data 312 can include an identification of whether a target object's polynomial and a lane-marking line's polynomial intersect and, if so, where. If the polynomials intersect, the predicted data 312 can also include an estimation of the time to line crossing associated with the target object cutting into, out of, or through a traffic lane, such as the traffic lane 206 in which the ego vehicle 202 is traveling.

Although FIG. 3 illustrates one example of a data flow 300 supporting prediction of a target object's behavior based on world and image frames, various changes may be made to FIG. 3. For example, information from one or more additional sources (such as one or more additional types of sensors 104) may be used within or to supplement the calculations shown here. Also, the specific types of data values shown here are for illustration only, and some of the data values may be omitted if not used in the various calculations performed by the processor 102 of the ego vehicle 202.

Figure 4:
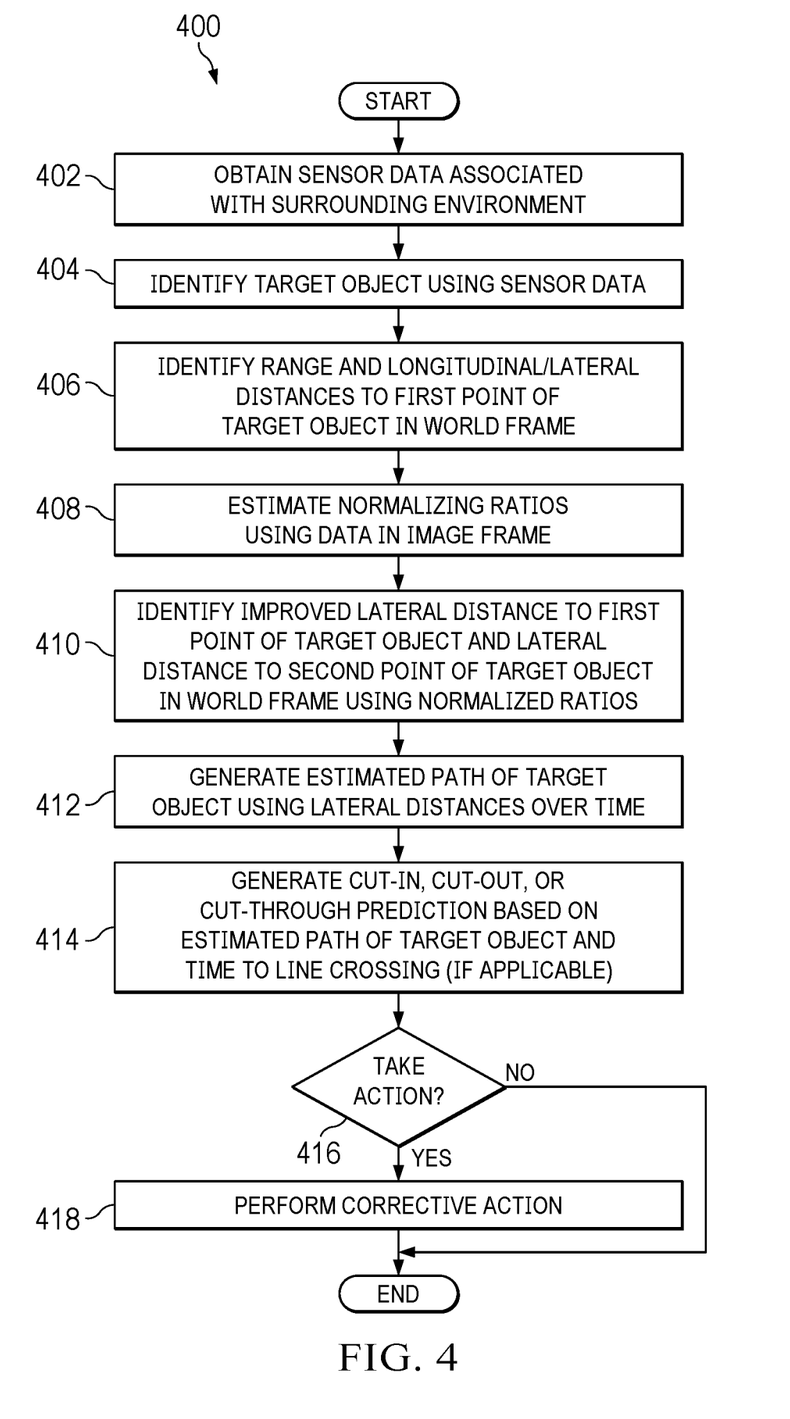
FIG. 4 illustrates an example method for prediction of a target object's behavior based on world and image frames according to this disclosure.

FIG. 4 illustrates an example method 400 for prediction of a target object's behavior based on world and image frames according to this disclosure. For ease of explanation, the method 400 of FIG. 4 is described as involving the use of the system 100 of FIG. 1, which may be used within or as the ego vehicle 202 of FIG. 2. However, the method 400 of FIG. 4 may be performed using any other suitable device or system, such as any other suitable device or system supporting or using object detection.

As shown in FIG. 4, sensor data associated with a surrounding environment around an ego vehicle or other system is obtained at step 402. This may include, for example, the processor 102 of the ego vehicle 202 obtaining information from various sensors 104, such as image data from one or more cameras 104a and relative distance and relative azimuth angles from one or more RADAR sensors 104b. A target object is identified using the sensor data at step 404. This may include, for example, the processor 102 identifying a target vehicle 204 or other target object in the vicinity of the system 100. A range (relative distance) and longitudinal/lateral distances to a first point of the target object are identified in a world frame at step 406. This may include, for example, the processor 102 identifying the relative distance $D_r(k)$ between the ego vehicle 202 and the rear corner "A" of the target vehicle 204. This may also include the processor 102 decomposing the relative distance $D_r(k)$ into longitudinal and lateral distances $(x_A(k), y_A(k))$.

Normalization ratios are estimated using image data within an image frame at step 408. This may include, for example, the processor 102 calculating a normalization ratio $L_r(k)/L_{tr}(k)$ and a normalization ratio $L_f(k)/L_{tf}(k)$ based on the numbers of pixels in different portions of a captured image. An improved lateral distance to the first point of the target object and a lateral distance to a second point of the target object are identified within the world frame using the normalization ratios at step 410. This may include, for example, the processor 102 using Equation (1) above to calculate a more-accurate lateral distance $y_A(k)$ to the rear corner "A" of the target vehicle 204. This may also include the processor 102 using Equations (2)-(3) above to calculate a longitudinal distance $x_B(k)$ and a lateral distance $y_B(k)$ to the front corner "B" of the target vehicle 204.

Note that steps 402-410 may occur multiple times over a given time period. At some point, adequate information is available for an estimated path of the target object over time to be estimated using the lateral distances (and possibly other information like the longitudinal distances) at step 412. This may include, for example, the processor 102 identifying a polynomial, such as one having the form shown in Equation (4), that predicts the future path of the target vehicle 204 based on the historical locations of the target vehicle 204. A cut-in, cut-out, or cut-through prediction is generated based on the estimated path of the target object at step 414. This may include, for example, the processor 102 determining whether the polynomial representing the estimated path of the target vehicle 204 intersects with a polynomial representing the path of a lane-marking line 210 or other line associated with the ego vehicle 202. If so, this may also include the processor 102 generating a time to line crossing value based on the identified intersection point and the speed of the target vehicle 204, such as by using Equation (5) above.

A determination is made whether any correction action should be taken at step 416. This may include, for example, the processor 102 using the time to line crossing value to determine whether a speed of the ego vehicle 202 should be changed or whether to initiate emergency braking, evasion steering, collision warning, or other action(s). If at least one correction action should be taken, the at least one correction action can be performed at step 418.

Although FIG. 4 illustrates one example of a method 400 for prediction of a target object's behavior based on world and image frames, various changes may be made to FIG. 4. For example, while shown as a series of steps, various steps in FIG. 4 may overlap, occur in parallel, occur in a different order, or occur any number of times. As a particular example, steps 402-410 may occur repeatedly in order to gather information about each of multiple target objects over time, and steps 412-418 may occur repeatedly (and in parallel with steps 402-410 after some initial data collection period) in order to process the information, make predictions, and (if necessary) take corrective actions in response to the predictions.

Note that many functional aspects of the various embodiments described above can be implemented using any suitable hardware or any suitable combination of hardware and software/firmware instructions. In some embodiments, at least some functional aspects of the various embodiments described above can be embodied as software instructions that are executed by one or more unitary or multi-core central processing units or other processing device(s). In other embodiments, at least some functional aspects of the various embodiments described above can be embodied using one or more application specific integrated circuits (ASICs). When implemented using on or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 5:
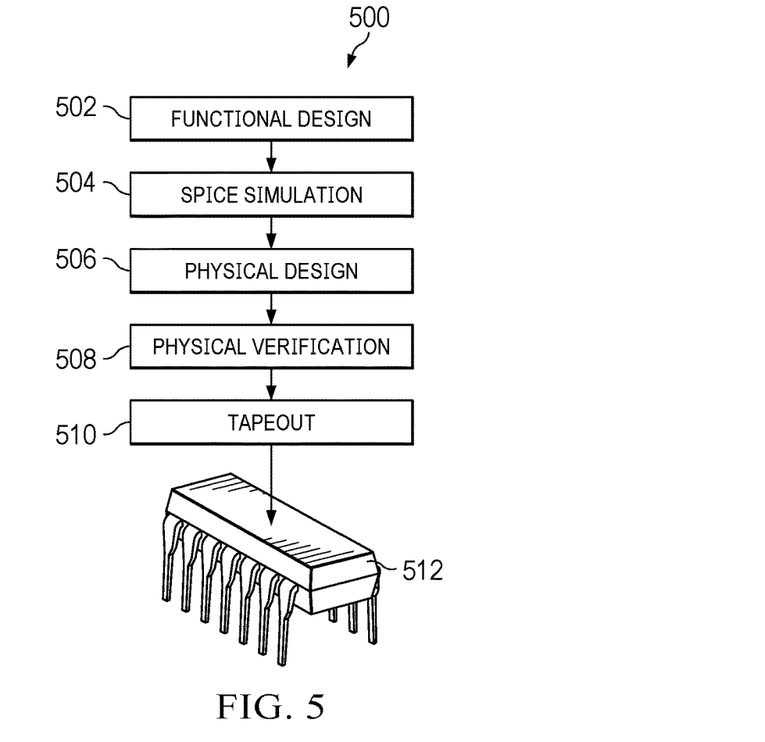
FIG. 5 illustrates an example design flow for employing one or more tools to design hardware that implements one or more control functions according to this disclosure.

FIG. 5 illustrates an example design flow 500 for employing one or more tools to design hardware that implements one or more control functions according to this disclosure. More specifically, the design flow 500 here represents a simplified ASIC design flow employing one or more EDA tools or other tools for designing and facilitating fabrication of ASICs that implement at least some functional aspects of the various embodiments described above.

As shown in FIG. 5, a functional design of an ASIC is created at step 502. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 504. This may include, for example, using the SPICE simulations or other simulations to verify that the functional design of the ASIC performs as expected.

A physical design of the ASIC is created based on the validated data structures and other aspects of the functional design at step 506. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 508. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 510. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 512.

Although FIG. 5 illustrates one example of a design flow 500 for employing one or more tools to design hardware that implements one or more control functions, various changes may be made to FIG. 5. For example, at least some functional aspects of the various embodiments described above may be implemented in any other suitable manner.

Figure 6:
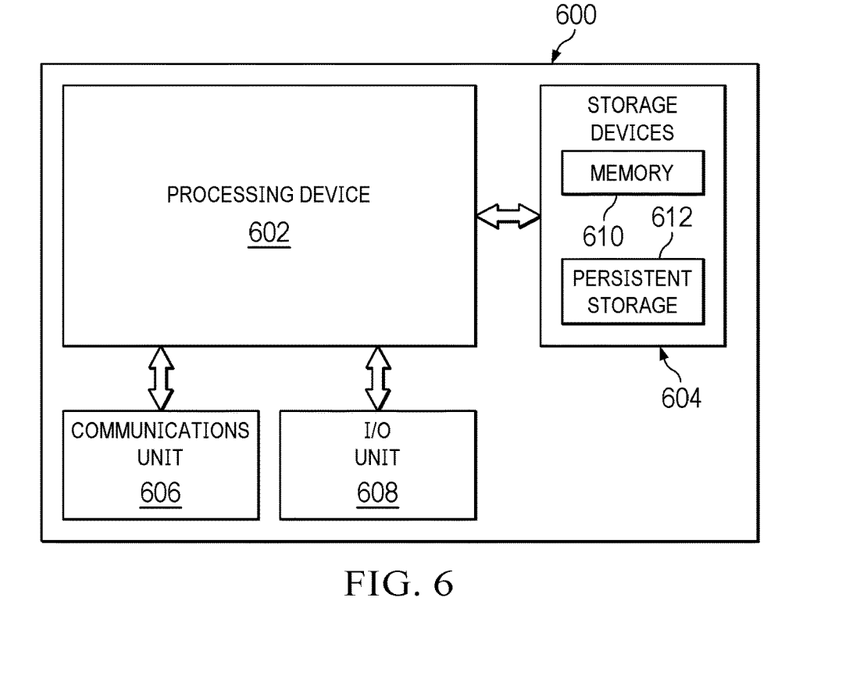
FIG. 6 illustrates an example device supporting execution of one or more tools to design hardware that implements one or more control functions according to this disclosure.

FIG. 6 illustrates an example device 600 supporting execution of one or more tools to design hardware that implements one or more control functions according to this disclosure. The device 600 may, for example, be used to implement at least part of the design flow 500 shown in FIG. 5. However, the design flow 500 may be implemented in any other suitable manner.

As shown in FIG. 6, the device 600 denotes a computing device or system that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other processing devices in any suitable arrangement. Example types of processing devices 602 include one or more microprocessors, microcontrollers, digital signal processors (DSPs), application specific integrated circuits (ASICs), field programmable gate arrays (FPGAs), or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the device 600 does not require local I/O, such as when the device 600 represents a server or other device that can be accessed remotely.

The instructions that are executed by the processing device 602 include instructions that implement at least part of the design flow 500. For example, the instructions that are executed by the processing device 602 may cause the processing device 602 to generate or otherwise obtain functional designs, perform simulations, generate physical designs, verify physical designs, perform tape-outs, or create/use photomasks (or any combination of these functions). As a result, the instructions that are executed by the processing device 602 support the design and fabrication of ASIC devices or other devices that implement one or more vehicle control functions described above.

Although FIG. 6 illustrates one example of a device 600 supporting execution of one or more tools to design hardware that implements one or more control functions, various changes may be made to FIG. 6. For example, computing and communication devices and systems come in a wide variety of configurations, and FIG. 6 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining sensor data associated with a target object at an ego vehicle, the sensor data comprising image data within an image frame;
identifying a first longitudinal distance and a first lateral distance of a first point of the target object from the ego vehicle as measured within a world frame;
identifying a first modified lateral distance of the first point of the target object from the ego vehicle as measured within the world frame using a first normalization ratio and the first lateral distance, the first normalization ratio determined using (i) a distance as measured in pixels in the image frame of the first point of the target object from a lane-marking line and (ii) a width as measured in pixels in the image frame of a traffic lane associated with the target object or the ego vehicle, the traffic lane partially defined by the lane-marking line;
predicting a future path of the target object based on the first longitudinal distance and the first modified lateral distance; and
controlling at least one operation of the ego vehicle based on the predicted future path of the target object.

2. The method of claim 1, further comprising:
identifying a second longitudinal distance and a second lateral distance of a second point of the target object from the ego vehicle as measured within the world frame; and
identifying a second modified lateral distance of the second point of the target object from the ego vehicle as measured within the world frame using a second normalization ratio that is based on the image data and the second lateral distance;
wherein the future path of the target object is predicted based on the first and second longitudinal distances and the first and second modified lateral distances.

3. The method of claim 2, wherein the second normalization ratio is determined using (i) a distance as measured in pixels of the second point of the target object from the lane-marking line and (ii) the width as measured in pixels of the traffic lane associated with the target object or the ego vehicle.

4. The method of claim 2, wherein:
the sensor data further comprises a radio detection and ranging (RADAR) measurement identifying a relative distance and a relative angle of the first point of the target object with respect to the ego vehicle; and
identifying the first longitudinal distance and the first lateral distance comprises decomposing the relative distance into the first longitudinal distance and a third the first lateral distance, the first longitudinal distance associated with a smaller error than the first lateral distance.

5. The method of claim 4, wherein:
the first normalization ratio comprises a first unit-less normalization ratio applied to a width of the traffic lane as measured within the world frame in order to identify the first modified lateral distance; and
the second normalization ratio comprises a second unit-less normalization ratio applied to the width of the traffic lane as measured within the world frame in order to identify the second modified lateral distance.

6. The method of claim 2, wherein:
the first point of the target object represents a rear corner of a target object; and
the second point of the target object represents a front corner of the target object.

7. The method of claim 1, wherein controlling the at least one operation of the ego vehicle comprises at least one of:
adjusting at least one of: a steering of the ego vehicle, a speed of the ego vehicle, and a braking of the ego vehicle; and
activating an audible, visible, or haptic warning.

8. The method of claim 1, wherein the first modified lateral distance of the first point of the target object from the ego vehicle is determined using:
the first normalization ratio;
a width of the traffic lane as measured within the world frame; and
a lateral offset of the target object from a longitudinal dimension of the world frame at the first longitudinal distance as measured in the world frame.

9. The method of claim 1, wherein the first modified lateral distance is determined using a formula of:

$$y\_(k) = L\_(k)/L_{t\_}(k) \cdot L_t(k) + \Delta_y(x)$$

wherein:
y_(k) represents the first modified lateral distance;
L_(k) represents the distance as measured in pixels of the first point of the target object from the lane-marking line;
$L_{t\_}$(k) represents the width as measured in pixels of the traffic lane associated with the target object or the ego vehicle;
$L_t$(k) represents a width of the traffic lane as measured within the world frame; and
$\Delta_y$(x) represents the first lateral offset of the target object from a longitudinal dimension of the world frame at the first longitudinal distance x_ as measured in the world frame.

10. The method of claim 1, wherein identifying the first modified lateral distance comprises multiplying the first normalization ratio by one of:
a width of a first traffic lane associated with the target object as measured within the world frame when the width of the first traffic lane is accurately measured; or
a width of a second traffic lane associated with the ego vehicle as measured within the world frame when the width of the first traffic lane cannot be accurately measured and assuming that the first and second traffic lanes are relatively equal in width.

11. An apparatus associated with an ego vehicle, the apparatus comprising:
at least one processing device configured to:
obtain sensor data associated with a target object, the sensor data comprising image data within an image frame;
identify a first longitudinal distance and a first lateral distance of a first point of the target object from the ego vehicle as measured within a world frame;
identify a first modified lateral distance of the first point of the target object from the ego vehicle as measured within the world frame using a first normalization ratio and the first lateral distance, the first normalization ratio determined using (i) a distance as measured in pixels in the image frame of the first point of the target object from a lane-marking line and (ii) a width as measured in pixels in the image frame of a traffic lane associated with the target object or the ego vehicle, the traffic lane partially defined by the lane-marking line;
predict a future path of the target object based on the first longitudinal distance and the first modified lateral distance; and
control at least one operation of the ego vehicle based on the predicted future path of the target object.

12. The apparatus of claim 11, wherein:
the at least one processing device is further configured to:
identify a second longitudinal distance and a second lateral distance of a second point of the target object from the ego vehicle as measured within the world frame; and
identify a second modified lateral distance of the second point of the target object from the ego vehicle as measured within the world frame using a second normalization ratio that is based on the image data and the second lateral distance; and
the future path of the target object is based on the first and second longitudinal distances and the first and second modified lateral distances.

13. The apparatus of claim 12, wherein the second normalization ratio is determined using (i) a distance as measured in pixels of the second point of the target object from the lane-marking line and (ii) the width as measured in pixels of the traffic lane associated with the target object or the ego vehicle.

14. The apparatus of claim 12, wherein:
the sensor data further comprises a radio detection and ranging (RADAR) measurement identifying a relative distance and a relative angle of the first point of the target object with respect to the ego vehicle; and
to identify the first longitudinal distance and the first lateral distance, the at least one processing device is configured to decompose the relative distance into the first longitudinal distance and the first lateral distance, the first longitudinal distance associated with a smaller error than the first lateral distance.

15. The apparatus of claim 14, wherein:
the first normalization ratio comprises a first unit-less normalization ratio applied to a width of the traffic lane as measured within the world frame in order to identify the first modified lateral distance; and
the second normalization ratio comprises a second unit-less normalization ratio applied to the width of the traffic lane as measured within the world frame in order to identify the second modified lateral distance.

16. The apparatus of claim 12, wherein:
the first point of the target object represents a rear corner of a target object; and
the second point of the target object represents a front corner of the target object.

17. The apparatus of claim 11, wherein, to control the at least one operation of the ego vehicle, the at least one processing device is configured to at least one of:
adjust at least one of: a steering of the ego vehicle, a speed of the ego vehicle, and a braking of the ego vehicle; and
activate an audible, visible, or haptic warning.

18. A non-transitory machine-readable medium containing instructions that when executed cause at least one processor associated with an ego vehicle to:
obtain sensor data associated with a target object, the sensor data comprising image data within an image frame;

identify a first longitudinal distance and a first lateral distance of a first point of the target object from the ego vehicle as measured within a world frame;

identify a first modified lateral distance of the first point of the target object from the ego vehicle as measured within the world frame using a first normalization ratio and the first lateral distance, the first normalization ratio determined using (i) a distance as measured in pixels in the image frame of the first point of the target object from a lane-marking line and (ii) a width as measured in pixels in the image frame of a traffic lane associated with the target object or the ego vehicle, the traffic lane partially defined by the lane-marking line;

predict a future path of the target object based on the first longitudinal distance and the first modified lateral distance; and control at least one operation of the ego vehicle based on the predicted future path of the target object.

19. The non-transitory machine-readable medium of claim 18, further containing instructions that when executed cause the at least one processor to:

identify a second longitudinal distance and a second lateral distance of a second point of the target object from the ego vehicle as measured within the world frame; and identify a second modified lateral distance of the second point of the target object from the ego vehicle as measured within the world frame using a second normalization ratio that is based on the image data and the second lateral distance;

wherein the future path of the target object is based on the first and second longitudinal distances and the first and second modified lateral distances.

20. The non-transitory machine-readable medium of claim 19, wherein the second normalization ratio is determined using (i) a distance as measured in pixels of the second point of the target object from the lane-marking line and (ii) the width as measured in pixels of the traffic lane associated with the target object or the ego vehicle.

21. The non-transitory machine-readable medium of claim 19, wherein:

the sensor data further comprises a radio detection and ranging (RADAR) measurement identifying a relative distance and a relative angle of the first point of the target object with respect to the ego vehicle; and the instructions that when executed cause the at least one processor to identify the first longitudinal distance and the first lateral distance comprise:

instructions that when executed cause the at least one processor to decompose the relative distance into the first longitudinal distance and the first lateral distance, the first longitudinal distance associated with a smaller error than the first lateral distance.

22. The non-transitory machine-readable medium of claim 21, wherein:

the first normalization ratio comprises a first unit-less normalization ratio applied to a width of the traffic lane as measured within the world frame in order to identify the first modified lateral distance; and the second normalization ratio comprises a second unit-less normalization ratio applied to the width of the traffic lane as measured within the world frame in order to identify the second modified lateral distance.

23. The non-transitory machine-readable medium of claim 19, wherein:

the first point of the target object represents a rear corner of a target object; and the second point of the target object represents a front corner of the target object.

24. The non-transitory machine-readable medium of claim 18, wherein the instructions that when executed cause the at least one processor to control the at least one operation of the ego vehicle comprise:

instructions that when executed cause the at least one processor to at least one of:

adjust at least one of: a steering of the ego vehicle, a speed of the ego vehicle, and a braking of the ego vehicle; and activate an audible, visible, or haptic warning.

* * * * *